US012677038B2

(12) United States Patent
Seo

(10) Patent No.: US 12,677,038 B2
(45) Date of Patent: Jul. 7, 2026

(54) DISPLAY DEVICE AND CONTROL METHOD THEREFOR

(71) Applicant: SAMSUNG ELECTRONICS CO., LTD., Suwon-si (KR)

(72) Inventor: Seunggi Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/118,219

(22) Filed: Mar. 7, 2023

(65) Prior Publication Data

US 2023/0217075 A1     Jul. 6, 2023

Related U.S. Application Data

(63) Continuation of application No. PCT/KR2021/010559, filed on Aug. 10, 2021.

(30) Foreign Application Priority Data

Sep. 23, 2020     (KR) ........................ 10-2020-0123348

(51) Int. Cl.
*H04N 21/24*        (2011.01)
*H04N 21/25*        (2011.01)
                    (Continued)

(52) U.S. Cl.
CPC ....... *H04N 21/4668* (2013.01); *H04N 21/435* (2013.01); *H04N 21/4622* (2013.01); *H04N 21/4662* (2013.01); *H04N 21/4826* (2013.01)

(58) Field of Classification Search
None
See application file for complete search history.

(56) References Cited

U.S. PATENT DOCUMENTS 7,756,868 B2     7/2010 Lee
9,514,206 B2     12/2016 Yeo et al.
                 (Continued)

FOREIGN PATENT DOCUMENTS

EP        1898418 A1     3/2008
JP     2019-101942 A     6/2019
                 (Continued)

OTHER PUBLICATIONS

International Search Report issued in International Application No. PCT/KR2021/010559 dated Nov. 10, 2021.
                 (Continued)

*Primary Examiner* — Brian T Pendleton
*Assistant Examiner* — Jean D Saint Cyr
(74) *Attorney, Agent, or Firm* — STAAS & HALSEY LLP

(57)        ABSTRACT

A display device comprising a memory in which a first application corresponding to a first content provision server and a second application corresponding to a second content provision server are stored; a display; and a processor to control, by executing the first application, the display to display a recommendation content list of content of the first content provision server based on a content use history of a user so that the content included in the recommended content list is aligned in a preset alignment. The preset alignment can be the same as an alignment of a recommendation content list of content of the second content provision server to be provided through the second application.

11 Claims, 13 Drawing Sheets

(51) Int. Cl.

| | |
|---|---|
| *H04N 21/435* | (2011.01) |
| *H04N 21/442* | (2011.01) |
| *H04N 21/462* | (2011.01) |
| *H04N 21/466* | (2011.01) |
| *H04N 21/475* | (2011.01) |
| *H04N 21/482* | (2011.01) |

(56) References Cited

U.S. PATENT DOCUMENTS

| | | | |
|---|---|---|---|
| 9,723,101 B2 | 8/2017 | Ko | |
| 2009/0043732 A1 | 2/2009 | Lee | |
| 2013/0081084 A1* | 3/2013 | Scheer | H04N 21/252 |
| | | | 725/46 |
| 2013/0268522 A1 | 10/2013 | Barrett | |
| 2014/0215525 A1 | 7/2014 | Jeong et al. | |
| 2014/0351336 A1 | 11/2014 | Yeo et al. | |
| 2015/0172764 A1* | 6/2015 | Chae | H04N 21/4316 |
| | | | 725/9 |
| 2015/0201246 A1 | 7/2015 | Son et al. | |
| 2015/0242427 A1 | 8/2015 | Ko | |
| 2015/0249865 A1* | 9/2015 | Oliveira | H04N 21/4667 |
| | | | 725/38 |
| 2016/0142783 A1* | 5/2016 | Bagga | H04N 21/26258 |
| | | | 725/47 |
| 2017/0094361 A1* | 3/2017 | Thomas | G06F 16/252 |
| 2017/0280196 A1 | 9/2017 | Thomas et al. | |
| 2020/0084488 A1 | 3/2020 | Christie et al. | |
| 2020/0221179 A1 | 7/2020 | Kim et al. | |
| 2020/0359097 A1* | 11/2020 | Yoo | H04N 21/4532 |
| 2021/0383479 A1* | 12/2021 | Syed | G06Q 40/08 |
| 2022/0147870 A1 | 5/2022 | Agarwal et al. | |

FOREIGN PATENT DOCUMENTS

| | | | |
|---|---|---|---|
| KR | 10-0462292 B1 | 12/2004 | |
| KR | 10-0866247 B1 | 10/2008 | |
| KR | 10-2013-0132698 | 12/2013 | |
| KR | 10-2014-0064031 | 5/2014 | |
| KR | 10-2014-0095854 A | 8/2014 | |
| KR | 10-2015-0084520 A | 7/2015 | |
| KR | 10-2015-0099628 A | 9/2015 | |
| KR | 10-1755409 B1 | 7/2017 | |
| KR | 10-1953305 B1 | 2/2019 | |
| KR | 10-1998677 B1 | 7/2019 | |
| KR | 10-2020-0085597 A | 7/2020 | |
| KR | 10-2020-0092465 A | 8/2020 | |
| WO | WO 2006/120867 A1 | 11/2006 | |
| WO | WO 2019/117547 A1 | 6/2019 | |
| WO | WO 2020/145596 A1 | 7/2020 | |

OTHER PUBLICATIONS

Written Opinion issued in International Application No. PCT/KR2021/010559 dated Nov. 10, 2021.

Extended European Search Report dated Dec. 22, 2023 issued in European Patent Application No. 21872711.3.

Korean Office Action dated Aug. 9, 2024 for Korean Patent Application No. 10-2020-0123348.

Office Action dated Apr. 28, 2026, issued in European Application No. 21 872 711.3.

* cited by examiner

| Category | Field |
|----------|-------|
| Person | person_id, name, (program_id), popularity |
| Program | programs_id, program_type, content_rating, original_air_date, score, (genres), season_number |

612

<METADATA OF THE X MOVIE - PROVIDE THE A DATA SOURCE>

620

621

| Category | Table name | Field |
|----------|-----------|-------|
| Person | DS_CREDIT | credit id, full name, date of birth, birth place |
|  | DS_CREDIT_IMAGE | Image_url, Folder_url |
| Program | DS_PROGRAM | (program id), release date |
|  | DS_PROGRAM_TITLE | title |
|  | DS_PROGRAM_GENRE | (Genre) ~622 |
|  | DS_PROGRAM_CREDIT | credit type, role name |
|  | DS_PROGRAM_IMAGE | Image_url |
|  | DS_SCHEDULE | TV Ratings |

<METADATA OF THE X MOVIE - PROVIDE THE B DATA SOURCE>

DISPLAY DEVICE AND CONTROL METHOD THEREFOR

CROSS-REFERENCE TO RELATED APPLICATIONS

This application is a continuation application, under 35 U.S.C. § 111(a), of international application No. PCT/KR2021/010559, filed on Aug. 10, 2021, which claims priority of a Korean patent application number 10-2020-0123348, filed Sep. 23, 2020, in the Korean Intellectual Property Office, the disclosures of which are incorporated by reference herein in their entirety.

BACKGROUND

Field

The disclosure relates to a display device that receives contents from a plurality of content servers, and a control method therefor.

Description of the Related Art

In the case of a conventional display device, in case a user using the device uses a plurality of services through independent applications, only a server corresponding to each service can provide contents and recommended content lists, and thus there is a problem that the method of aligning a recommended content list is not unified among each service.

SUMMARY

A display device according to an embodiment of the disclosure includes a memory storing a first application corresponding to a first content provision server and a second application corresponding to a second content provision server, a display, and a processor configured to, by executing the first application, control the display to display a recommended content list of content of the first content provision server based on a content use history of a user so that the content included in the recommended content list is aligned in a preset alignment, wherein the preset alignment in which the content of the first content provision server is aligned on the display may be same as an alignment of a recommended content list of content of the second content provision server to be provided through the second application.

Here, the content use history may include a use history of contents from the first content provision server and a use history of contents from the second content provision server different from the first content provision server.

Also, the memory may further store a second application corresponding to the second content provision server, and the processor may, by executing the second application, control the display to display the recommended content list of the content of the second content provision server based on the content use history associated with the user.

Here, the processor may provide information related to the preset alignment of the content of the first content provision server included in the recommended content list provided through the first application to the second application, and wherein the second application may provide the recommended content list of the content of the second content provision server based on the information related to the preset alignment.

Here, the preset alignment of the content of the first content provision server included in the recommended content list may be determined based on at least one of genres of contents, producers of contents, directors of contents, or actors of contents.

Meanwhile, the content use history associated with the user may include at least one of genre information of contents received from the first content provision server and the second content provision server, use frequency information of the first application and the second application, or time information based on contents being received from the first content provision server and the second content provision server.

Also, metadata formats of the contents provided from the first content provision server and the second content provision server may be the same.

In addition, a metadata type of the content of the second content provision server may be different from a metadata type of the content of the first content provision server, and the processor may obtain information of same type as partial information in the metadata of the content of the first content provision server based on the metadata type of the content of the second content provision server, and obtain the content use history based on the partial information and the obtained information.

Here, the processor may input the metadata of the content of the second content provision server into a neural network model and obtain information of the same type as the partial information, and the neural network model may be trained to convert the metadata of the content of the second content provision server into the same type as the metadata of the content of from the first content provision server.

Meanwhile, the processor may, based on a specific content being selected from the recommended content list, control the display to display a deep link item including information on a third application that supports reproduction of the specific content.

Meanwhile, a control method for a display device storing a first application corresponding to a first content provision server and a second application corresponding to a second content provision server according to an embodiment of the disclosure includes, by executing the first application, obtaining a content use history of a user, and displaying a recommended content list of the content of the first content provision server based on the content use history of the user so that the content included in the recommended content list is aligned in a preset alignment, wherein the preset alignment in which the content of the first content provision server is aligned for the displaying may be same as an alignment of a recommended content list of content of the second content provision server corresponding to the second application to be provided through the second application.

Here, the content use history may include a use history of contents from the first content provision server and a use history of contents from the second content provision server different from the first content provision server.

Also, the control method may further include, by executing the second application, displaying the recommended content list of the content of the second content provision server based on the content use history associated with the user.

Here, the control method may further include providing information related to the preset alignment of the content of the first content provision server included in the recommended content list provided through the first application to the second application, wherein the second application may provide the recommended content list of the content of the second content provision server based on the information related to the preset alignment.

Here, the preset alignment of the content of the first content provision server included in the recommended content list may be determined based on at least one of genres of contents, producers of contents, directors of contents, or actors of contents.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a diagram for illustrating metadata of different types for the same content according to an embodiment of the disclosure;

DETAILED DESCRIPTION

Figure 1:
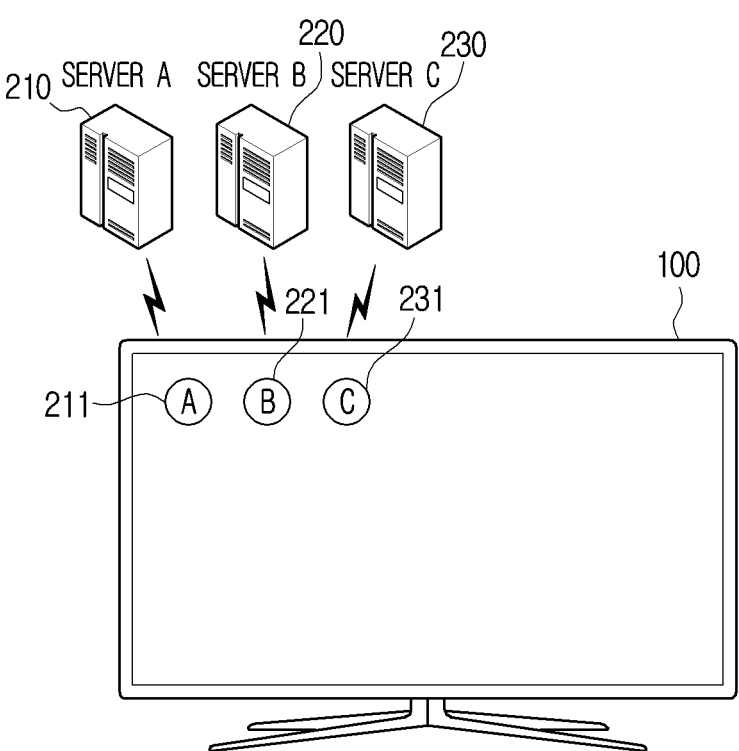
FIG. 1 is a diagram illustrating a configuration of an electronic system according to an embodiment of the disclosure.

Hereinafter, the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies, etc. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in the disclosure, expressions such as "have," "may have," "include," and "may include" denote the existence of such characteristics (e.g.: elements such as numbers, functions, operations, and components), and do not exclude the existence of additional characteristics.

In addition, the expression "at least one of A and/or B" should be interpreted to mean any one of "A" or "B" or "A and B."

Further, the expressions "first," "second," and the like used in the disclosure may describe various elements regardless of any order and/or degree of importance. Also, such expressions are used only to distinguish one element from another element, and are not intended to limit the elements.

Also, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

In addition, singular expressions include plural expressions, unless defined obviously differently in the context. Further, in the disclosure, terms such as "include" and "comprising" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Also, in the disclosure, "a module" or "a part" performs at least one function or operation, and may be implemented as hardware or software, or as a combination of hardware and software. Further, a plurality of "modules" or a plurality of "parts" may be integrated into at least one module and implemented as at least one processor (not shown), except "a module" or "a part" that needs to be implemented as specific hardware.

In addition, in the disclosure, the term "user" may refer to a person who uses an electronic device or a device using an electronic device (e.g.: an artificial intelligence electronic device).

The disclosure is for addressing the aforementioned need, and the purpose of the disclosure is in providing a display device that can provide the same alignment for contents provided from a plurality of content servers, and a control method therefor.

According to the various embodiments of the disclosure, a user can be provided with content lists according to the same alignment even in the case of using various services.

Hereinafter, an embodiment of the disclosure will be described in more detail with reference to the accompanying drawings.

FIG. 1 is a diagram illustrating a configuration of an electronic system according to an embodiment of the disclosure.

According to FIG. 1, a system according to an embodiment of the disclosure may include a display device 100 and a plurality of content provision servers 210, 220, 230.

The display device 100 according to an embodiment of the disclosure means an electronic device including a display. Specifically, the display device 100 may be implemented not only as a TV, a monitor, a laptop PC, a mobile phone, a PDA, a kiosk, and a video wall, but also as various types of home appliances such as a refrigerator or a washing machine, an air conditioner, etc. including a display 120.

The display device 100 according to an embodiment of the disclosure may receive various types of contents such as a game content, a movie content, a home shopping content, a drama content, a VR content, etc. from the plurality of content provision servers 210, 220, 230, and provide the contents.

The plurality of content provision servers 210, 220, 230 according to an embodiment of the disclosure may be implemented as a central server (or an integrated server) that takes charge of interactions between various kinds of operating systems and applications in all network systems, or as a cloud server using cloud computing technologies. Also, the plurality of content provision servers 210, 220, 230 may be servers operated by the same content provider or different content providers.

In this case, the plurality of content provision servers 210, 220, 230 may perform communication via wire or wirelessly with the display device 100, and may provide contents through individual applications 211, 221, 231 stored in the display device 100.

For example, the server A 210 may provide contents through the corresponding application A 211, and the server B 220 may provide contents through the application B 221, and the server C 230 may provide contents through the application C 231, respectively.

Based on a user's manipulation being input, the display device 100 may drive an application corresponding to the user's manipulation, and receive contents from an external server corresponding to the driven application, and display the contents. Also, the display device 100 may be provided with a recommended content list aligned based on metadata related to the contents streamed or downloaded by the user from the external server.

The recommended content list is a list that aligned the contents provided from the external server in the order of the contents preferred by the user based on the metadata related to the contents streamed or downloaded by the user through the application.

For example, if the user mainly streamed (or downloaded) movies in the 'action' genre from the server A 210, the A application 211 corresponding to the server A 210 may provide a recommended content list that preferentially aligned contents having metadata regarding the 'action' genre to the display device 100.

However, recommended content lists provided from the server B 220 and the server C 230 separate from the server A 210 are generally provided in separate alignments from the recommended content list provided from the server A 210. Accordingly, hereinafter, various embodiments that can provide recommended content lists provided from the plurality of respective servers in the same alignment will be described.

Figure 2:
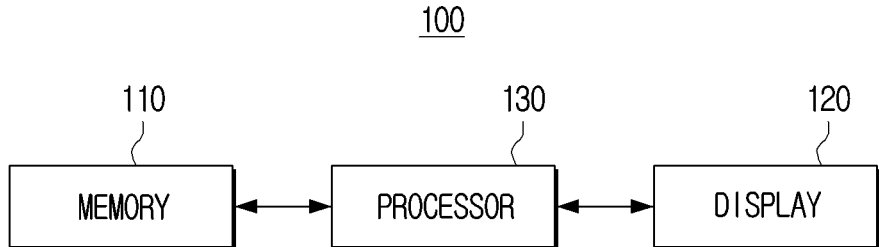
FIG. 2 is a block diagram for illustrating a configuration of a display device according to an embodiment of the disclosure.

FIG. 2 is a block diagram for illustrating a configuration of a display device according to an embodiment of the disclosure.

The memory 110 may store data necessary for the various embodiments of the disclosure. The memory 110 may be implemented in a form of a memory embedded in the display device 100, or in a form of a memory that can be attached to or detached from the display device 100, according to the usage of stored data. For example, in the case of data for operating the display device 100, the data may be stored in a memory embedded in the display device 100, and in the case of data for an extended function of the display device 100, the data may be stored in a memory that can be attached to or detached from the display device 100. Meanwhile, in the case of a memory embedded in the display device 100, the memory may be implemented as at least one of a volatile memory (e.g.: a dynamic RAM (DRAM), a static RAM (SRAM), or a synchronous dynamic RAM (SDRAM), etc.) or a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). Also, in the case of a memory that can be attached to or detached from the display device 100, the memory may be implemented in forms such as a memory card (e.g., compact flash (CF), secure digital (SD), micro secure digital (Micro-SD), mini secure digital (Mini-SD), extreme digital (xD), a multi-media card (MMC), etc.), an external memory that can be connected to a USB port (e.g., a USB memory), etc.

According to an embodiment, the memory 110 may store at least one instruction for controlling the display device 100, or a computer program including instructions.

According to another embodiment, the memory 110 may store information on a neural network model including a plurality of layers. Here, storing information on a neural network model may mean storing various information related to operations of the neural network model, e.g., information on a plurality of layers included in the neural network model, information on parameters (e.g., a filter coefficient, a bias, etc.) used in the plurality of respective layers, etc. For example, the memory 110 may store information on a neural network model trained to obtain recommended administration information according to an embodiment. Meanwhile, in case the processor 130 is implemented as hardware dedicated to a neural network model, information on the neural network model may be stored in a memory inside the processor 130.

According to an embodiment, the memory 110 may be implemented as a single memory storing data generated from various operations according to the disclosure. However, according to another embodiment, the memory 110 may be implemented to include a plurality of memories that store different types of data respectively, or store data generated in different steps respectively.

According to an embodiment, the memory 110 may store at least one instruction executed by an application and the processor 130. Here, the instruction may be an instruction for the processor 130 to input an input image into the neural network model, and obtain an output image.

The display 120 may be implemented as displays in various forms such as a liquid crystal display (LCD), an organic light emitting diodes (OLED) display, a quantum dot light-emitting diodes (QLED) display, a plasma display panel (PDP), etc. Inside the display 120, driving circuits that may be implemented in forms such as an a-si TFT, a low temperature poly silicon (LTPS) TFT, an organic TFT (OTFT), etc., a backlight unit, etc. may also be included together. Meanwhile, the display 120 may be implemented as a touch screen combined with a touch sensor, a flexible display, a 3D display, etc.

The processor 130 controls the overall operations of the display device 100.

Specifically, the processor 130 may be connected with each component of the display device 100, and control the overall operations of the display device 100. For example, the processor 130 may be connected with the memory 110 and the display 120, and control the operations of the display device 100.

According to an embodiment, the processor 130 may be referred to as various names such as a digital signal processor (DSP), a microprocessor, a central processing unit (CPU), a micro controller unit (MCU), a micro processing unit (MPU), a neural processing unit (NPU), a controller, an application processor (AP), etc., but it is described as the processor 130 in this specification. The processor 130 may be implemented as a system on chip (SoC) or large scale integration (LSI), or in the form of a field programmable gate array (FPGA). Also, the processor 130 may include a volatile memory such as an SRAM, etc.

The processor 130 according to an embodiment may execute an application provided with contents from the first content provision server (referred to as a first application hereinafter), and thereby provide the contents provided from the first content provision server through the display 120.

In particular, the processor 130 may control the display 120 to display a recommended content list provided from the first content provision server in a preset alignment based on a content use history of a user.

Here, the content use history may include a use history of contents provided from the first content provision server and a use history of contents provided from the second content provision server different from the first content provision server. For example, the content use history may include information related to metadata of contents that the display device 100 provided to the user through the first application, and the second application providing contents received from the second content provision server. The content use history may include at least one of the names of the contents, the genres of the contents, and the time of providing the contents that were provided to the user.

The metadata included in the content use history according to an embodiment of the disclosure may have been identified through automatic content recognition (ACR). The ACR is an identification technology for recognizing contents that are reproduced at a media device or that exist in a media file, and a device including ACR support can swiftly obtain additional information for a content viewed by a user through a user-based input or a search work.

Here, the preset alignment may be identical to the alignment of the recommended content list provided from the second content provision server through an application provided with contents from the second content provision server (referred to as a second application hereinafter).

That is, according to an embodiment of the disclosure, the processor 130 can improve a user's convenience by providing recommended content lists provided from the plurality of different content provision servers in the same alignment.

Also, the processor 130 can control the display 120 to display the recommended content list provided from the second content provision server by executing the second application stored in the memory 110. In this case, the recommended content list may be provided in the same alignment as the recommended content list provided from the first application.

Here, the second application may provide the recommended content list provided from the second content provision server based on information related to the alignment of the recommended contents provided through the first application.

Here, the alignment of the recommended content list may be determined based on at least one of the genres of the contents, the producers of the contents, the directors of the contents, or the actors of the contents.

Meanwhile, a content use history of a user may include at least one of genre information of contents received from the first and second content provision servers, use frequency information of the first and second applications, or time information based on contents being received from the first and second content provision servers.

The processor 130 according to an embodiment of the disclosure may align a recommended content list based on use frequency information of applications included in a content use history. Specifically, in case a user uses an A application more often than a B application, the processor 130 may determine the alignment of the recommended content list by preferentially considering metadata regarding contents provided through the A application more than metadata regarding contents provided through the B application.

In case a user uses the A application more often than the B application, the processor 130 according to another embodiment of the disclosure may convert the metadata type of the contents provided through the B application into the metadata type of the contents provided through the A application.

Also, the processor 130 may determine the alignment of a recommended content list for each time slot based on information on the time of receiving contents from the first and second content provision servers. For example, in case a user mainly views contents in the 'game' genre in the morning rush hour, and mainly views contents in the 'music' genre in the evening rush hour, the processor 130 may align the recommended content list by applying an alignment of preferentially recommending contents in the 'game' genre in the morning rush hour, and preferentially recommending contents in the 'music' genre in the evening rush hour.

According to an embodiment, the metadata formats of contents provided from the first and second content provision servers may be the same. For example, in case the first and second content provision servers are operated by the same content provider, the metadata formats of the contents may be the same.

According to another embodiment, the metadata type of the contents provided from the second content provision server may be different from the metadata type of the contents provided from the first content provision server. For example, in case the first and second content provision servers are operated by different content providers, the metadata formats of the contents may be the same. In this case, the processor 130 may obtain information of the same type as partial information in the metadata of the contents provided from the first content provision server based on the metadata type of the contents provided from the second content provision server, and obtain the content use history based on the partial information and the obtained information.

Here, the processor 130 may obtain the information of the same type as the partial information by inputting the metadata of the contents provided from the second content provision server into the neural network model. The neural network model may have been trained to convert the metadata of the contents provided from the second content provision server into the same type as the metadata of the contents provided from the first content provision server.

Meanwhile, based on a specific content being selected from the recommended content list, the processor 130 may control the display to display a deep link item including information on a third application that can reproduce the specific content.

The third application according to an embodiment of the disclosure is an application stored in the memory 110, and it may be an application that is provided with contents from a third content provision server that does not share metadata with the first and second content provision servers communicating with the display device 100.

Figure 3:
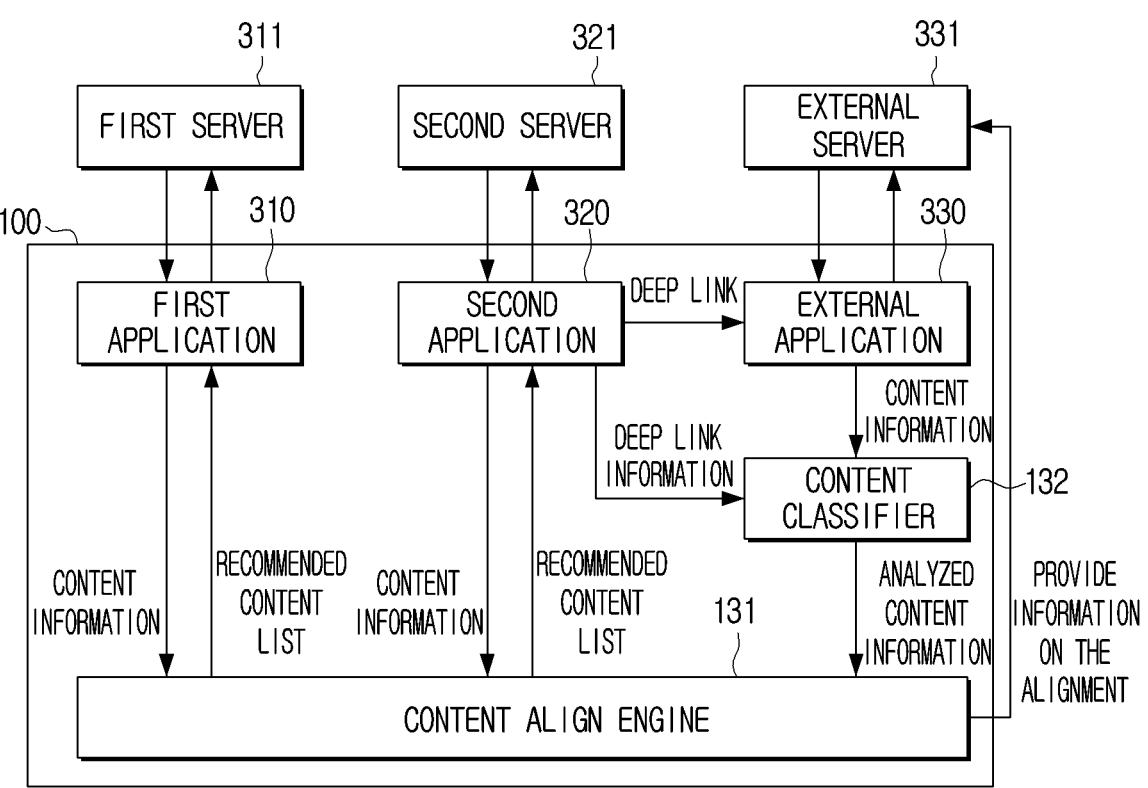
FIG. 3 is a diagram for illustrating transmission and receipt of data between a display device and a server according to an embodiment of the disclosure.

FIG. 3 is a diagram for illustrating transmission and receipt of data between a display device and a server according to an embodiment of the disclosure.

The first content provision server 311 and the second content provision server 321 according to an embodiment of the disclosure may provide contents to the display device 100. The first content provision server 311 and the second content provision server 321 according to an embodiment may be servers sharing metadata regarding the provided contents.

For example, both of the first content provision server 311 and the second content provision server 321 may provide movie contents, and may use metadata of the same type related to movie contents.

In contrast, an external server 331 according to an embodiment of the disclosure may be a server that does not share metadata with the first content provision server 311 and the second content provision server 321. The external server may provide movie contents like the first content provision server 311 and the second content provision server 321, but it may use metadata of a different type from the metadata used at the first content provision server 311 and the second content provision server 321.

The display device 100 according to an embodiment of the disclosure may store a first application 310, a third application 320, and an application provided with contents from the external server 331 (referred to as an external application 330) in the memory 110.

The processor 130 according to an embodiment of the disclosure may comprise a content align engine 131 and a content classifier 132.

The content align engine 131 according to an embodiment of the disclosure performs a function of aligning recommended content lists provided from each application. The content align engine 131 may obtain content information provided through the plurality of applications 310, 320, 330. Here, the content information may be a content use history of a user.

The content align engine 131 according to an embodiment of the disclosure may align recommended content lists provided from each server 311, 321, 331 in a preset alignment based on metadata of the contents included in the content use history. Then, the content align engine 131 may display the aligned recommended content lists through the display 120.

The content align engine 131 according to an embodiment of the disclosure may determine the alignment of the recommended content list provided from the first content provision server 311 through the first application 310 and the alignment of the recommended content list provided from the second content provision server 321 through the second application 320 to be the same.

As the first content provision server 311 and the second content provision server 321 use metadata of the same type, the content align engine 131 can determine the alignment of the recommended content lists based on the content information obtained from the first and second applications 310, 320 without having to go through separate pre-processing.

In contrast, the external server 331 providing contents to the external application 330 may use metadata of a different type from the first content provision server 311 and the second content provision server 321, and thus the content align engine 131 may obtain content information including the metadata used at the external server 331 by performing pre-processing.

The content classifier 132 according to an embodiment of the disclosure may analyze the content information obtained from the external application 330, and transmit the analyzed content information to the content align engine 131. The content classifier 132 according to an embodiment may be a neural network model. The content classifier 132 may have been trained (machine learning) to convert the metadata of the contents provided from the external server 331 into the same type as the metadata of the contents provided from the first content provision server 311 and the second content provision server 321.

Also, in case the first application 310 or the second application 320 was executed, based on a specific content being selected from a recommended content list, the display device 100 according to another embodiment of the disclosure may display a deep link on the display 120.

The deep link is an address that performs a function of, based on a specific address or value being input, executing an application, or moving to a specific screen inside an application, and its type is divided into a URI scheme method, an app link method, a universal link method, etc. The processor 130 may identify a user's input through the deep link displayed in the form of a UI on the display 120 and execute an application designated in the deep link, or display a specific screen in an application.

Based on a user's input through the deep link being identified from the first application 310 or the second application 320, the content classifier 132 according to an embodiment may obtain deep link information and analyze the information.

The deep link information may include metadata regarding information that can be provided to a user through the deep link in the first application 310 or the second application 320. For example, as the second application 320 and the external application 330 use metadata of different types, even if the deep link regarding the external application 330 is displayed by executing the second application 320, it may be impossible to display all the information included in the metadata used by the external application 330. In this case, the content classifier 132 may analyze the deep link information including only restrictive metadata, and convert the metadata used in the external application into the same type as the metadata used in the second application.

The content align engine 131 according to an embodiment of the disclosure may align the recommended content list based on the analyzed content information including the metadata converted by the content classifier 132. In this case, the standard for the content align engine 131 to align the recommended content list may be the same as the method of aligning the recommended content lists that will be provided through the first application 310 and the second application 320.

The content align engine 131 according to an embodiment of the disclosure may provide information on the aforementioned alignment of the recommended content list to the external server 331. The external server may receive the information, and align a recommended content list to be provided through the external application 330 later by itself based on the received information.

As described above, the display device 100 according to an embodiment of the disclosure does not transmit a content use history of a user to an external server, but the content align engine 131 determines an alignment of a recommended content list based on a content use history by itself, and thus there is an effect that personal information can be protected more safely.

Figure 4A:
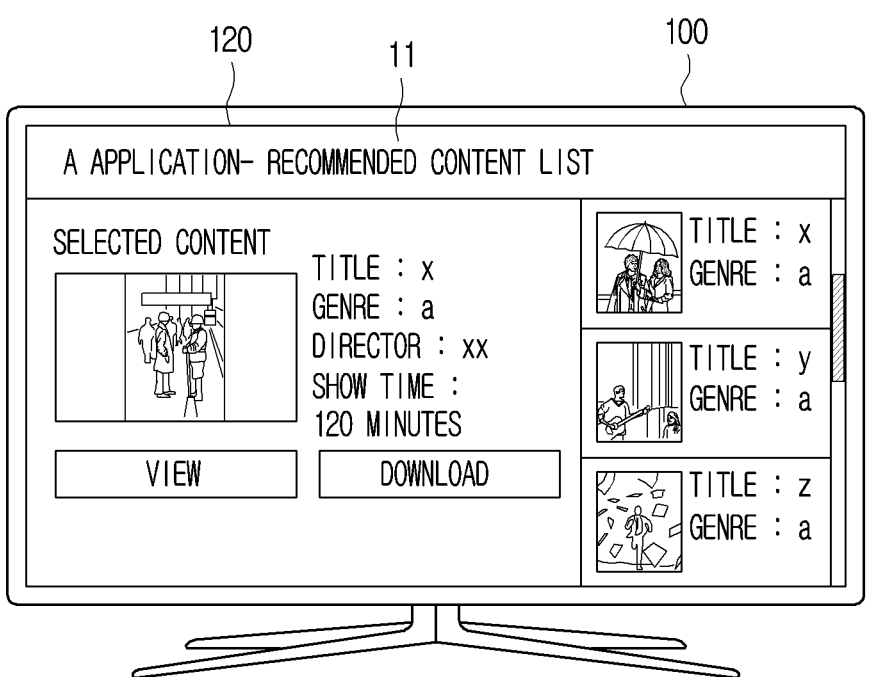
FIG. 4A illustrates provision of a recommended content list from a first application according to an embodiment of the disclosure.

FIG. 4A illustrates provision of a recommended content list from a first application according to an embodiment of the disclosure.

In case an A application is executed, the display device 100 according to an embodiment of the disclosure may display a recommended content list 11 on the display 120.

The display device 100 according to an embodiment of the disclosure may display a recommended content list aligned based on a content use history of a user on the right side of the display 120.

The reason that the display device 100 according to an embodiment preferentially recommends a content of the 'a' genre to a user using the A application may be because the user usually streamed or downloaded contents of the 'a' genre through the A application frequently.

Figure 4B:
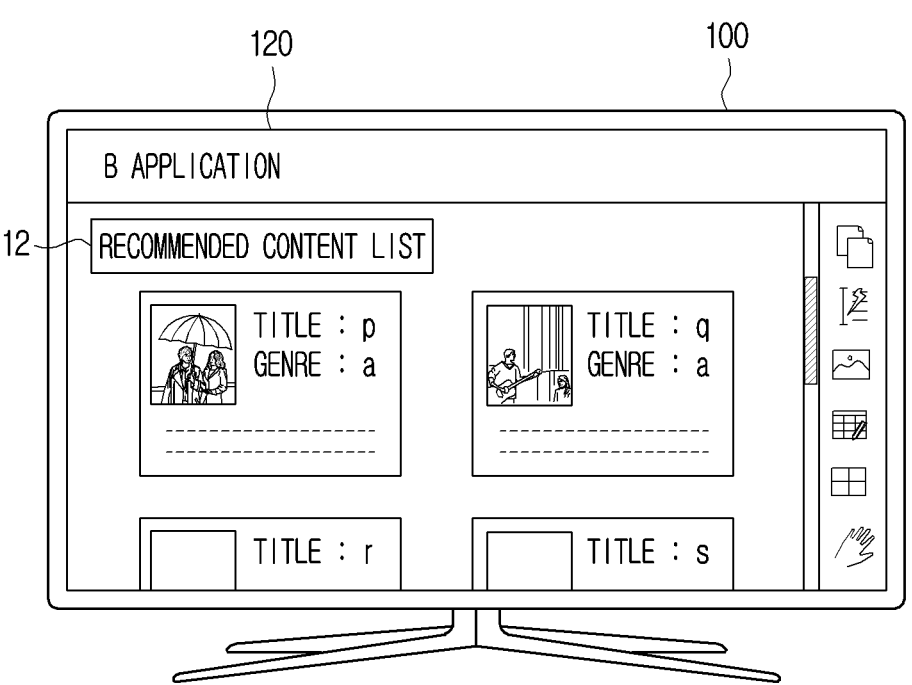
FIG. 4B illustrates provision of a recommended content list from a second application according to an embodiment of the disclosure.

FIG. 4B illustrates provision of a recommended content list from a second application according to an embodiment of the disclosure.

The display device 100 according to an embodiment of the disclosure may provide a recommended content list 12 to a user using a B application through a UI different from the A application.

The contents provided from the A application and the B application according to an embodiment of the disclosure may be different from one another, but the processor 130 may align the recommended content list provided through the B application in the same manner as the manner of aligning the recommended content list provided through the A application.

As a result, the display device 100 may display a recommended content list wherein the contents of the 'a' genre that were preferentially arranged in the recommended content list provided through the A application are preferentially arranged through the display 120, by executing the B application.

Figure 5A:
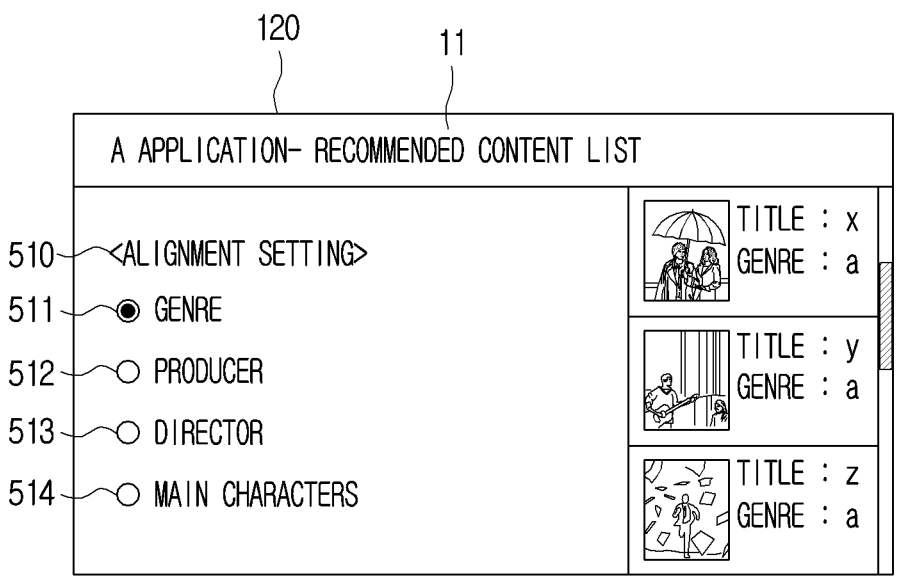
FIG. 5A illustrates provision of a recommended content list according to various alignments by a display device according to an embodiment of the disclosure.

FIG. 5A illustrates provision of a recommended content list according to various alignments by a display device according to an embodiment of the disclosure.

The display device 100 according to an embodiment of the disclosure may align a recommended content list according to various alignments.

In the case of providing a recommended content list 11 by executing the A application, the processor 130 according to an embodiment may align the recommended content list 11 based on any one of the genres 511 of the contents, the producers 512 of the contents, the directors 513 of the contents, or the main characters 514 of the contents.

The processor 130 according to an embodiment may display a UI 510 that may receive an input of a selection manipulation regarding a plurality of preset alignments on the left side of the display 120. Based on any one of the plurality of alignments being selected, the processor 130 may align the recommended content list 11 based on the selected alignment, and display the list.

The plurality of alignments illustrated in FIG. 5A are merely examples, and the processor 130 can obviously align the recommended content list 11 based on different methods.

Figure 5B:
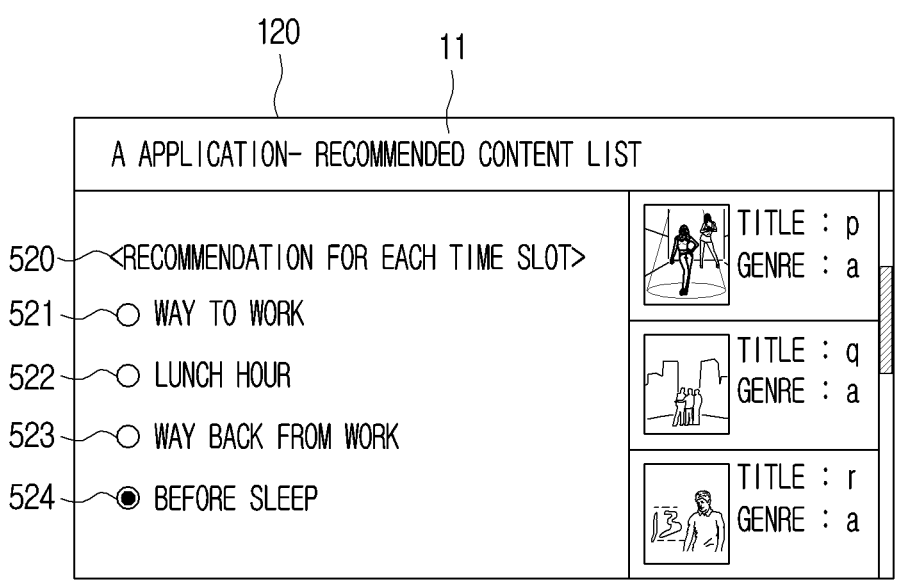
FIG. 5B illustrates provision of a recommended content list for each of various time slots by a display device according to an embodiment of the disclosure.

FIG. 5B illustrates provision of a recommended content list for each of various time slots by a display device according to an embodiment of the disclosure.

In the case of providing the recommended content list 11 by executing the A application, the processor 130 according to an embodiment may align the recommended content list 11 based on an alignment of a recommended content list for each time slot corresponding to any one time slot among a way to work 521, a lunch hour 522, a way back from work 523, or before sleep 524.

The time slots corresponding to the various time slots according to an embodiment, to be specific, the way to work 521, the lunch hour 522, the way back from work 523, and before sleep 524, etc. may be time slots that were arbitrarily designated by the user.

The processor 130 may display a UI 520 that may receive an input of a selection manipulation regarding alignments of a recommended content list for each time slot corresponding to various time slots on the left side of the display 120, and based on any one among the plurality of time slots being selected, the processor 130 may align the recommended content list 11 based on the alignment of the recommended content list for each time slot corresponding to the selected time slot, and display the list.

The plurality of time slots illustrated in FIG. 5B are merely examples, and the processor 130 can obviously align the recommended content list 11 based on alignments of a recommended content list for each time slot corresponding to the different time slots.

FIG. 6 is a diagram for illustrating metadata of different types for the same content according to an embodiment of the disclosure.

The types of metadata generated from different data sources for one content may be different. Here, explanation will be described based on the assumption of a case wherein a data source according to an embodiment of the disclosure is a server. For example, as in FIG. 6, regarding one content which is an X movie, the type of metadata 610 generated from an A data source (an A server) may be different from the type of metadata 620 generated from a B data source (a B server).

Also, different metadata for one content (the X content) may have different types, and also, field values included may be different. For example, in the metadata 610 generated from the A data source, character information may not be included, and in the metadata 620 generated from the B data source, the release year may not be included.

In this case, character information cannot be extracted from the metadata 610 generated from the A data source, and accordingly, in case the processor 130 uses the metadata 610 generated from the A data source, there is a problem that a method of aligning a recommended content list based on character information cannot be applied.

The processor 130 according to an embodiment of the disclosure may convert the metadata 620 generated from the B data source into the type of the metadata 610 generated from the A data source. Specifically, the processor 130 may convert the program id 621 included in the metadata 620 generated from the B data source into the program_id 611 which is a field value in the metadata 610 generated from the A data source. Also, the processor 130 may convert the Genre 622 included in the metadata 620 generated from the B data source into the genres 612 which is a field value in the metadata 610 generated from the A data source.

The processor 130 may also perform conversion of metadata by inputting a field value which does not coincide with the field values in the metadata 610 generated from the A data source, among the field values included in the metadata 620 generated from the B data source, into the neural network model.

Figure 7A:
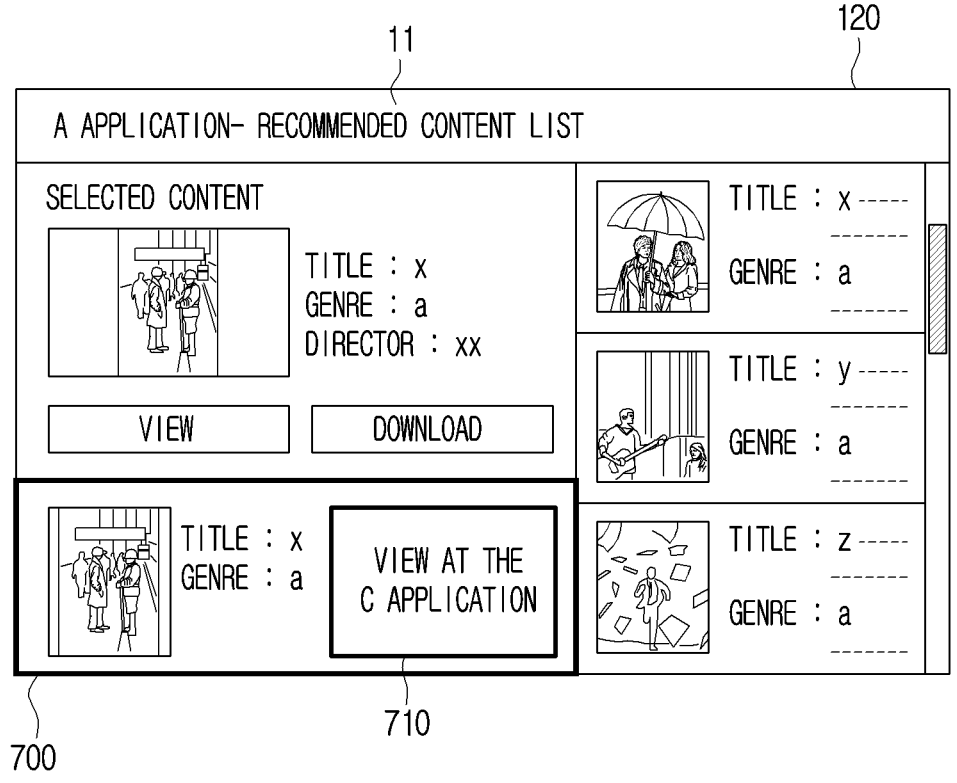
FIG. 7A is a diagram for illustrating a deep link according to an embodiment of the disclosure.

FIG. 7A is a diagram for illustrating a deep link according to an embodiment of the disclosure.

The display device 100 according to an embodiment of the disclosure may display the recommended content list 11 on the right side of the display 120 through the A application. In case the user selects a specific content from the recommended content list 11, the processor 130 may display detailed information for the content on the left side of the display 120, and at the same time, display a deep link UI 700.

In the deep link UI 700 according to an embodiment of the disclosure, information related to contents based on metadata used in a C application that is provided with contents from an external server not sharing metadata with the A server corresponding to the A application may be included. As illustrated in FIG. 6, the types of metadata generated in the A server and the external server may be different, and thus the information related to contents provided through the deep link UI 700 may include only restrictive information.

The processor 130 may display a UI mediating connection to the C application on the deep link UI 700 (referred to as a connection UI 710 hereinafter). Based on a user's input through the connection UI being received, the processor 130 may execute the C application.

Figure 7B:
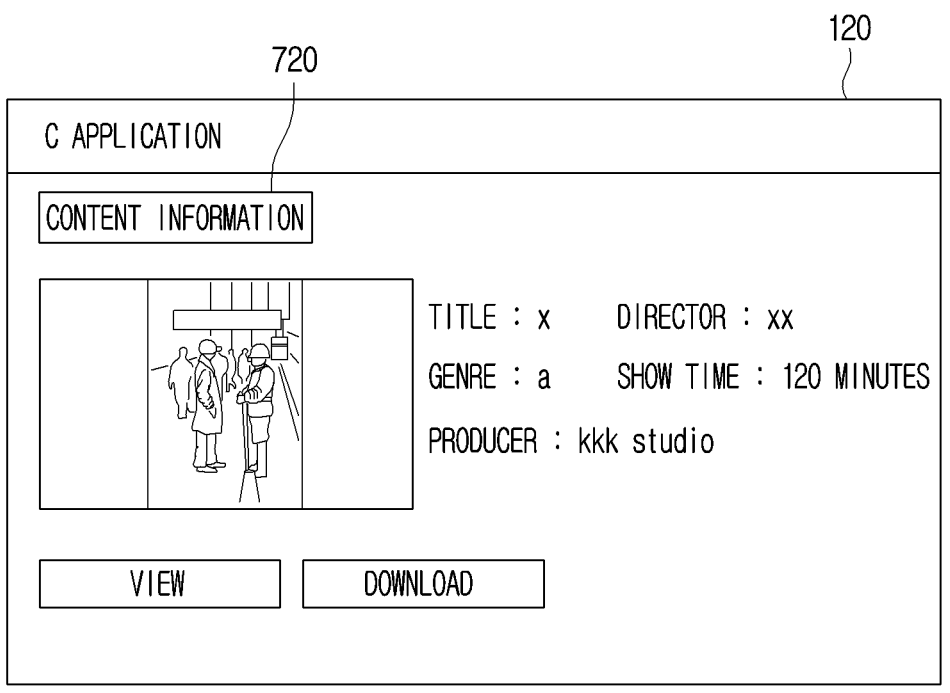
FIG. 7B is a diagram for illustrating provision of contents from another application through a deep link according to an embodiment of the disclosure.

FIG. 7B is a diagram for illustrating provision of contents from another application through a deep link according to an embodiment of the disclosure.

The processor 130 according to an embodiment of the disclosure may execute the C application according to a manipulation through the connection UI illustrated in FIG. 7A. In case the processor 130 executes the C application, all of the detailed information 720 related to contents that were not included in the deep link UI 700 may be displayed. As a result, the display device 100 may provide the contents included in the recommended content list provided through the A application through the C application using metadata of a different type from the metadata for the contents.

Figure 8:
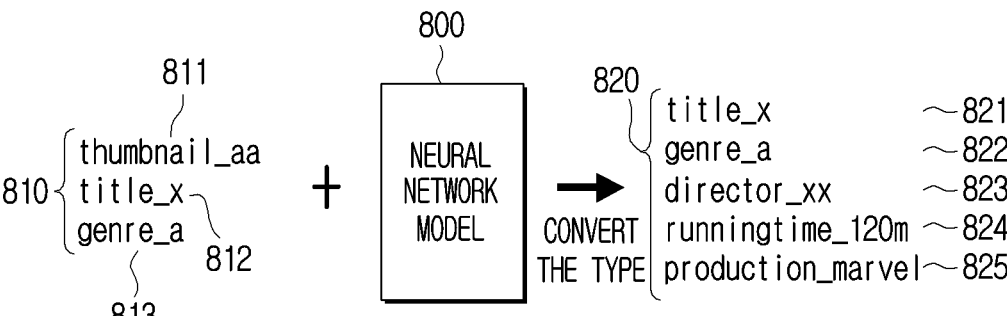
FIG. 8 is a diagram for illustrating conversion of metadata through a neural network model according to an embodiment of the disclosure.

FIG. 8 is a diagram for illustrating conversion of metadata through a neural network model according to an embodiment of the disclosure.

The neural network model 800 according to an embodiment of the disclosure may be a model that went through machine learning based on various types of metadata. For example, the neural network model 800 may be a model trained based on at least one of a plurality of sample data (or training data).

The display device 100 according to an embodiment of the disclosure may store the neural network model 800 in the memory 110, but the neural network model 800 may also have been stored in a separate server (not shown).

The processor 130 according to an embodiment of the disclosure may convert metadata through the neural network model 800. The metadata 810 before conversion may be converted into metadata 820 of a different type through the neural network model 800.

Specifically, the processor 130 may convert information on movie titles 812 and genre information 813 through the neural network model 800, and then include information on movie titles 821 and genre information 822 in the metadata 820. In contrast, information on thumbnails 811 may not be included in the metadata 820 after conversion.

The processor 130 may include new field information that was not included in the metadata 810 before conversion in the metadata 820 after conversion. Specifically, information on the directors 823, information on the show times 824, and information on the producers 825 were not included in the metadata 810 before conversion, but the processor 130 may have newly included the information in the metadata 820 after conversion through the neural network model 800.

Figure 9:
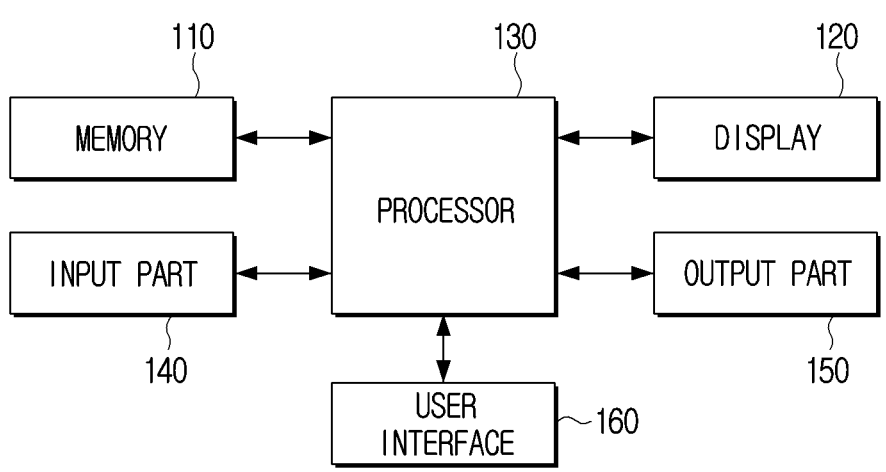
FIG. 9 is a block diagram for illustrating a functional configuration of a display device in detail according to an embodiment of the disclosure.

FIG. 9 is a block diagram for illustrating a functional configuration of a display device in detail according to an embodiment of the disclosure.

According to FIG. 9, the display device 100' includes a memory 110, a processor 130, an input part 140, a display 120, an output part 150, and a user interface 160. Among the components illustrated in FIG. 9, regarding components that overlap with the components illustrated in FIG. 2, detailed explanation will be omitted.

The input part 140 receives inputs of various types of contents. For example, the input part 140 may receive inputs of image signals by a streaming or download method from an external device (e.g., a source device), an external storage medium (e.g., a USB memory), an external server (e.g., a webhard), etc. through communication methods such as Wi-Fi based on AP (Wi-Fi, a wireless LAN network), Bluetooth, Zigbee, a wired/wireless local area network (LAN), a wide area network (WAN), Ethernet, IEEE 1394, a high-definition multimedia interface (HDMI), a universal serial bus (USB), a mobile high-definition link (MHL), Audio Engineering Society/European Broadcasting Union (AES/EBU), optical, coaxial, etc. Here, an image signal may be a digital image signal of any one of a standard definition (SD), a high definition (HD), a full HD, or an ultra HD image, but is not limited thereto.

The output part 150 outputs audio signals. For example, the output part 150 may convert a digital audio signal processed at the processor 130 into an analog audio signal and amplify the signal, and output the signal. For example, the output part 150 may include at least one speaker unit, a D/A converter, an audio amplifier, etc. that can output at least one channel. According to an embodiment, the output part 150 may be implemented to output various multi-channel audio signals. In this case, the processor 130 may control the output part 150 to perform enhance-processing of an input audio signal to correspond to enhance-processing of an input image, and output the signal. For example, the processor 130 may convert an input two-channel audio signal into a virtual multi-channel (e.g., a 5.1 channel) audio signal, or recognize the location wherein the display device 100' is placed and process the signal into a stereoscopic audio signal optimized for the space, or provide an optimized audio signal according to the type of an input image (e.g., the genre of the content).

The user interface 160 may be implemented as a device such as a button, a touch pad, a mouse, and a keyboard, or implemented as a touch screen, a remote control transceiver, etc. that can perform the aforementioned display function and a manipulation input function together. The remote control transceiver may receive a remote control signal from an external remote control device, or transmit a remote control signal through at least one communication method among infrared communication, Bluetooth communication, and Wi-Fi communication.

The display device 100' may additionally include a tuner and a demodulation part depending on implementation examples. The tuner (not shown) may tune a channel selected by a user among radio frequency (RF) broadcasting signals received through an antenna, or all pre-stored channels, and receive an RF broadcasting signal. The demodulation part (not shown) may receive a converted digital IF (DIF) signal from the tuner, and perform channel demodulation, etc. According to an embodiment, an input image received through the tuner may be processed through the demodulation part (not shown), and then provided to the processor 130 for image processing according to an embodiment.

Figure 10:
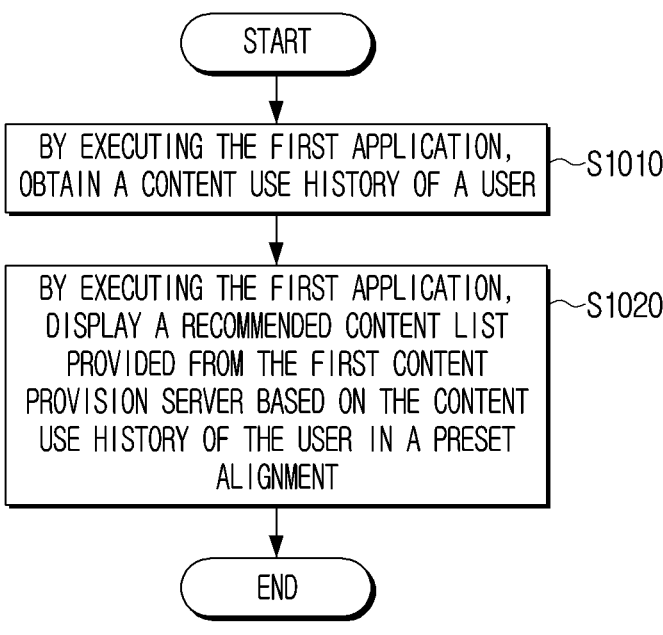
FIG. 10 is a flow chart for illustrating a control method according to an embodiment of the disclosure.

FIG. 10 is a flow chart for illustrating a control method according to an embodiment of the disclosure.

In a control method for a display according to an embodiment of the disclosure, a content use history of a user is obtained by executing the first application in operation S1010. Then, a recommended content list provided from the first content provision server based on the content use history of the user may be displayed in a preset alignment in operation S1020.

Here, the preset alignment may be the same as the alignment of a recommended content list provided from the second content provision server corresponding to the second application through the second application.

Here, the content use history may include a use history of contents provided from the first content provision server and a use history of contents provided from the second content provision server different from the first content provision server.

Also, the control method may further include, by executing the second application, displaying the recommended content list provided from the second content provision server based on the content use history of the user.

Here, the control method may further include providing information related to the alignment of the recommended content list provided through the first application to the second application, and the second application may provide the recommended content list provided from the second content provision server based on the information related to the alignment.

Here, the alignment of the recommended content list may be determined based on at least one of genres of contents, producers of contents, directors of contents, or actors of contents.

Meanwhile, the content use history of the user may include at least one of genre information of contents received from the first and second content provision servers, use frequency information of the first and second applications, or time information being contents being received from the first and second content provision servers.

Also, metadata formats of the contents provided from the first and second content provision servers may be the same.

In addition, a metadata type of the contents provided from the second content provision server may be different from a metadata type of the contents provided from the first content provision server, and the control method may further include obtaining information of the same type as partial information in the metadata of the contents provided from the first content provision server based on the metadata type of the contents provided from the second content provision server, and obtaining the content use history based on the partial information and the obtained information.

Here, in the obtaining information of the same type, the metadata of the contents provided from the second content provision server may be input into a neural network model and information of the same type as the partial information may be obtained.

Also, the neural network model may have been trained to convert the metadata of the contents provided from the second content provision server into the same type as the metadata of the contents provided from the first content provision server.

Meanwhile, the control method may further include, based on a specific content being selected from the recommended content list, displaying a deep link item including information on a third application that can reproduce the specific content.

Meanwhile, the methods according to the various embodiments of the disclosure as described above may be implemented in forms of applications that can be installed on conventional display devices.

Also, the methods according to the various embodiments of the disclosure as described above may be implemented just with software upgrade, or hardware upgrade of conventional display devices.

In addition, the various embodiments of the disclosure as described above may be performed through an embedded server provided on a display device, or an external server of at least one of display devices.

Meanwhile, the various embodiments described above may be implemented in a recording medium that can be read by a computer or a device similar to a computer, by using software, hardware, or a combination thereof. In some cases, the embodiments described in this specification may be implemented as the processor 130 itself. According to implementation by software, the embodiments such as procedures and functions described in this specification may be implemented as separate software modules. Each of the software modules can perform one or more functions and operations described in this specification.

Meanwhile, computer instructions for performing processing operations of the display device 100 according to the various embodiments of the disclosure as described above may be stored in a non-transitory computer-readable medium. Computer instructions stored in such a non-transitory computer-readable medium make the processing operations at the display device 100 according to the various embodiments as described above performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM, and the like.

While preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A display device comprising:
   a memory storing a first application corresponding to a first content provision server and a second application corresponding to a second content provision server;
   a display; and
   a processor configured to:
      by executing the first application,
         input metadata of content of the second content provision server into a neural network model and obtain information of same type as a partial information in metadata of content of the first content provision server,
         obtain a content use history based on the partial information and the obtained information,
         control the display to display a recommended content list of content of the first content provision server aligned according to a preset alignment that is a same as an alignment of a recommended content list of content provided by the second content provision server, the recommended content list of content of the first content provision server being based on the content use history of a user, wherein a metadata type of the content of the second content provision server is different from a metadata type of the content of the first content provision server, wherein the neural network model is trained to convert the metadata of the content of the second content provision server into a same type as the metadata of the content of the first content provision server, wherein the recommended content list of content of the first content provision server is different from a pre-recommended content list of content of the first content provision server before being aligned according to the preset alignment, the alignment of the recommended content list of content provided by the second content provision server is used to display a recommended content list of content of the second content provision server that is based on the content use history of the user, the recommended content list of content of the first content provision server including a plurality of contents obtained from the first content provision server, the content use history includes information related to metadata of a plurality of contents provided through the first application and the second application, the second application providing a plurality of contents received from the second content provision server, and the recommended content list of content of the first content provision server and the recommended content list of content of the second content provision server are aligned to be different from each other prior to the preset alignment based on the metadata respectively to provide the plurality of contents received from the first content provision server through the first application and provide plurality of contents received from the second content provision server through the second application.

2. The display device of claim 1, wherein the processor is configured to:

by executing the second application, control the display to display the recommended content list of the content of the second content provision server based on the content use history associated with the user.

3. The display device of claim 2, wherein the processor is configured to:

provide information related to the preset alignment of the content of the first content provision server included in the recommended content list provided through the first application to the second application, and wherein the second application provides the recommended content list of the content of the second content provision server based on the information related to the preset alignment.

4. The display device of claim 3, wherein the preset alignment of the content of the first content provision server included in the recommended content list is determined based on at least one of genres of contents, producers of contents, directors of contents, and actors of contents.

5. The display device of claim 1, wherein the content use history associated with the user includes at least one of genre information of contents received from the first content provision server and the second content provision server, use frequency information of the first application and the second application, and time information based on contents being received from the first content provision server and the second content provision server.

6. The display device of claim 1, wherein metadata formats of the content of the first content provision server are same as metadata formats of the content of the second content provision server.

7. The display device of claim 1, wherein the processor is configured to:

based on a specific content being selected from the recommended content list, control the display to display a deep link item including information on a third application that supports reproduction of the specific content.

8. A control method for a display device storing a first application corresponding to a first content provision server and a second application corresponding to a second content provision server, the control method comprising:

by executing the first application, inputting metadata of content of the second content provision server into a neural network model and obtaining information of a same type as a partial information in metadata of content of the first content provision server, obtaining a content use history of a user based on the partial information and the obtained information; and displaying, on a display, a recommended content list of content of the first content provision server aligned according to a preset alignment that is a same as an alignment of a recommended content list of content provided by the second content provision server, the recommended content list of content of the first content provision server being based on the content use history of the user, wherein the metadata type of the content of the second content provision server is different from a metadata type of the content of the first content provision server, wherein the neural network model is trained to convert the metadata of the content of the second content provision server into a same type as the metadata of the content of the first content provision server, wherein the recommended content list of content of the first content provision server is different from a pre-recommended content list of content of the first content provision server before being aligned according to the preset alignment, the alignment of the recommended content list of content provided by the second content provision server is used to display a recommended content list of content of the second content provision server that is based on the content use history of the user, the recommended content list of content of the first content provision server including a plurality of contents obtained from the first content provision server, the content use history includes information related to metadata of a plurality of contents provided through the first application and the second application, the second application providing contents received from the second content provision server, the recommended content list of content of the first content provision server and the recommended content list of content of the second content provision server is aligned are aligned to be different from each other prior to the preset alignment based on the metadata respectively to provide the plurality of contents received from the first content provision server through the first application and provide plurality of contents received from the second content provision server through the second application.

9. The control method of claim 8, further comprising:
by executing the second application, displaying, on the display, the recommended content list of the content of the second content provision server based on the content use history associated with the user.

10. The control method of claim 9, further comprising:
providing information related to the preset alignment of the content of the first content provision server included in the recommended content list provided through the first application to the second application,
wherein the second application provides the recommended content list of the content of the second content provision server based on the information related to the preset alignment.

11. The control method of claim 10,
wherein the preset alignment of the content of the first content provision server included in the recommended content list is determined based on at least one of genres of contents, producers of contents, directors of contents, and actors of contents.

\* \* \* \* \*